(12) United States Patent
Komazawa et al.

(10) Patent No.: US 11,050,896 B2
(45) Date of Patent: Jun. 29, 2021

(54) INFORMATION CONTROL APPARATUS, PRINT SYSTEM, AND NON-TRANSITORY COMPUTER READABLE MEDIUM

(71) Applicant: FUJIFILM BUSINESS INNOVATION CORP., Tokyo (JP)

(72) Inventors: Hisao Komazawa, Kanagawa (JP); Hideo Kato, Kanagawa (JP); Shingo Ichijima, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 218 days.

(21) Appl. No.: 16/190,479

(22) Filed: Nov. 14, 2018

(65) Prior Publication Data
US 2019/0166273 A1 May 30, 2019

(30) Foreign Application Priority Data
Nov. 27, 2017 (JP) .............................. JP2017-226989

(51) Int. Cl.
*H04N 1/00* (2006.01)
*G06F 3/12* (2006.01)

(52) U.S. Cl.
CPC ......... *H04N 1/00724* (2013.01); *G06F 3/121* (2013.01); *G06F 3/1252* (2013.01); *H04N 1/00779* (2013.01); *H04N 1/00793* (2013.01)

(58) Field of Classification Search
CPC ............................ H04N 1/00724; G06F 3/121
See application file for complete search history.

(56) References Cited

U.S. PATENT DOCUMENTS

2008/0030784 A1* 2/2008 Sakuraba ............. G06F 3/1208
358/1.18
2016/0080600 A1* 3/2016 Nishida ............. H04N 1/00063
358/1.14

FOREIGN PATENT DOCUMENTS

| JP | 2008-173845 A | 7/2008 |
| JP | 2008-217420 A | 9/2008 |
| JP | 2011-235591 A | 11/2011 |
| JP | 2014-238887 A | 12/2014 |

OTHER PUBLICATIONS

Apr. 20, 2021 Office Action issued in Japanese Patent Application No. 2017-226989.

* cited by examiner

*Primary Examiner* — Ibrahim Siddo
(74) *Attorney, Agent, or Firm* — Oliff PLC

(57) ABSTRACT

An information control apparatus controls a printer device. The printer device performs printing on a sheet fed from a sheet feeder in accordance with a print instruction. The information control apparatus includes a controller. In a case in which the printer device outputs a check sheet while the print instruction is being executed, if a sheet to be used as the check sheet is a prohibited type of sheet to be prohibited from being used as the check sheet, the controller performs control so that the prohibited type of sheet will be switched to a sheet which is preset as a substitute type of sheet and the sheet feeder will feed the sheet preset as the substitute type of sheet.

17 Claims, 10 Drawing Sheets

INFORMATION CONTROL APPARATUS, PRINT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-226989 filed Nov. 27, 2017.

BACKGROUND

Technical Field

The present invention relates to an information control apparatus, a print system, and a non-transitory computer readable medium.

SUMMARY

According to an aspect of the invention, there is provided an information control apparatus for controlling a printer device. The printer device performs printing on a sheet fed from a sheet feeder in accordance with a print instruction. The information control apparatus includes a controller. In a case in which the printer device outputs a check sheet while the print instruction is being executed, if a sheet to be used as the check sheet is a prohibited type of sheet to be prohibited from being used as the check sheet, the controller performs control so that the prohibited type of sheet will be switched to a sheet which is preset as a substitute type of sheet and the sheet feeder will feed the sheet preset as the substitute type of sheet.

BRIEF DESCRIPTION OF THE DRAWINGS

An exemplary embodiment of the present invention will be described in detail based on the following figures, wherein.

DETAILED DESCRIPTION

Figure 1:
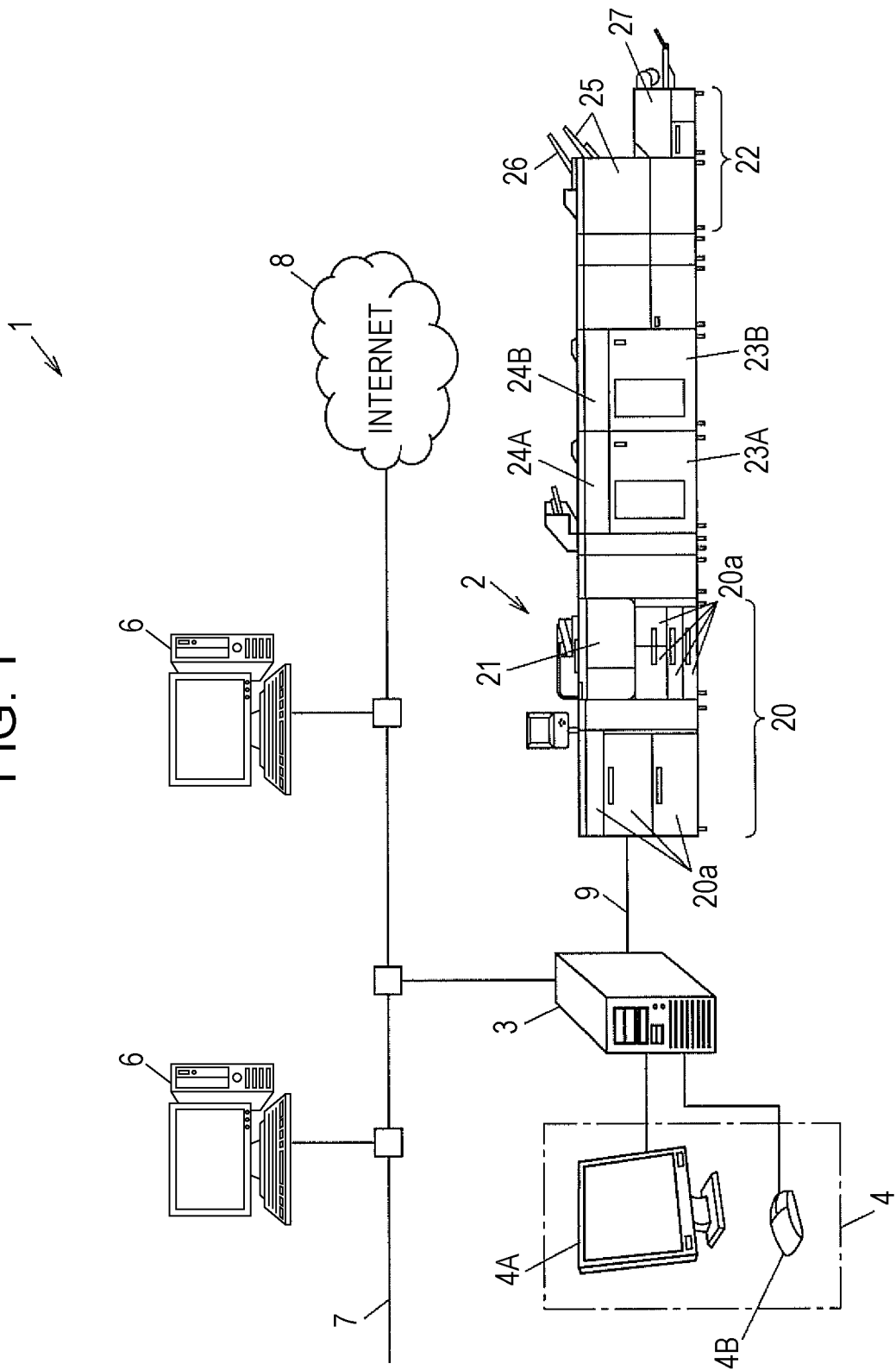
FIG. 1 illustrates an example of the configuration of a print system according to the exemplary embodiment.

An exemplary embodiment of the invention will be described below with reference to the accompanying drawings. In the individual drawings, elements having substantially the same function are designated by like reference numeral, and an explanation thereof will not be repeated.

[Overview of Exemplary Embodiment]

An information control apparatus according to the exemplary embodiment controls a printer device. The printer device performs printing on a sheet fed from a sheet feeder in accordance with a print instruction. The information control apparatus includes a controller. In a case in which the printer device outputs a check sheet while the print instruction is being executed, if a sheet to be used as the check sheet is a prohibited type of sheet to be prohibited from being used as the check sheet, the controller performs control so that the prohibited type of sheet will be switched to a sheet which is preset as a substitute type of sheet and the sheet feeder will feed the sheet preset as the substitute type of sheet.

Among pages indicated by a print instruction (may also be called a print job), a check page is printed on a sheet as a check sheet (may also be called a sample sheet), and the printed sheet is loaded in a loader, or a blank sheet is output and loaded in a loader as a check sheet without printing the check page on the sheet. Printing of a sample sheet may also be called sample printing. If the check page is blank, the sample sheet is output as a blank sheet. Sample printing is performed in the following cases, for example: when printing has temporarily stopped due to an error or paper out during the execution of a print job; when the execution of a print job has temporarily stopped in response to an instruction from a user; and when the insertion of a sample sheet is performed during the execution of a print job without stopping printing. After a check page is printed as a sample on a sample sheet, the check page is also printed on the same type of sheet as that used before the sample sheet has been printed, and the sheets are loaded in a loader. The check page printed on a sample sheet is not necessarily constituted by one page, but plural consecutive check pages may be printed on sample sheets. As described above, one of the cases in which a sample sheet is output is when printing has temporarily stopped due to an error or paper out during the execution of a print job. In this case, the purpose of outputting a sample sheet may be to indicate a portion in which an error is occurring. For this purpose, a blank sheet may be output, or predetermined error output data may be printed and output as a sample sheet.

[Exemplary Embodiment]

FIG. 1 illustrates an example of the configuration of a print system 1 according to the exemplary embodiment. The print system 1 includes a printer 2, a print server 3, a user display 4, and personal computers (PCs) 6. The printer 2 performs printing. The print server 3 controls the printer 2. The user display 4 includes a monitor 4A and an input device 4B and is connected to the print server 3. The PCs 6 are examples of plural terminal apparatuses. The printer 2 is an example of a printer device. The print server 3 is an example of an information control apparatus.

The print server 3 and the PCs 6 are connected to each other via a network 7, such as a local area network (LAN), connected to the Internet 8. The printer 2 and the print server 3 are connected to each other via a network 9, such as a LAN.

The printer 2 includes a sheet feeder 20, a printer unit 21, a post-processor 22, and plural sheet output units. The sheet feeder 20 feeds a sheet to the printer unit 21. The printer unit 21 performs printing on the sheet fed from the sheet feeder 20. The post-processor 22 performs post-processing on the sheet printed by the printer unit 21. The printed sheet is output to a sheet output unit. The sheet feeder 20 includes plural sheet feeder trays 20a. One of the plural sheet feeder trays 20a may be dedicated to the use for storing only index sheets which are output in a predetermined order. An index sheet is a sheet having a projecting portion, and information is printed on this projecting portion. The printer 2 may not necessarily include the post-processor 22. The sheet output units are examples of a loader.

Examples of the sheet output units of the printer 2 are stacker trays 23A and 23B (may also be called a stacker tray 1 and a stacker tray 2, respectively), stacker output trays 24A and 24B (may also be called a stacker output tray 1 and a stacker output tray 2, respectively), a finisher tray 25, a finisher output tray 26, and an external finisher 27. The stacker trays 23A and 23B and the finisher tray 25 have the capacity to load a large number of printed materials. The stacker output trays 24A and 24B and the finisher output tray 26 are top trays provided on the upper part of the printer 2, and have the capacity to load a small number of printed materials. The top trays are examples of a specific loader.

The print server 3 receives a print job sent from a PC 6 via the network 7 and performs control via the network 9 so that the printer 2 will perform printing in accordance with the print job. The print server 3 manages the print order of print jobs sent from the PCs 6 and also converts print data included in a print job into image data that can be processed by the printer 2.

As the monitor 4A of the user display 4, a display, such as a liquid crystal display or an organic electroluminescence (EL) display, may be used. As the input device 4B of the user display 4, a mouse and a keyboard may be used. The monitor 4A may be a touchscreen monitor that also serves as an input device as well as a display. In this case, the provision of the input device 4B may be omitted.

(Configuration of Print Server)

Figure 2:
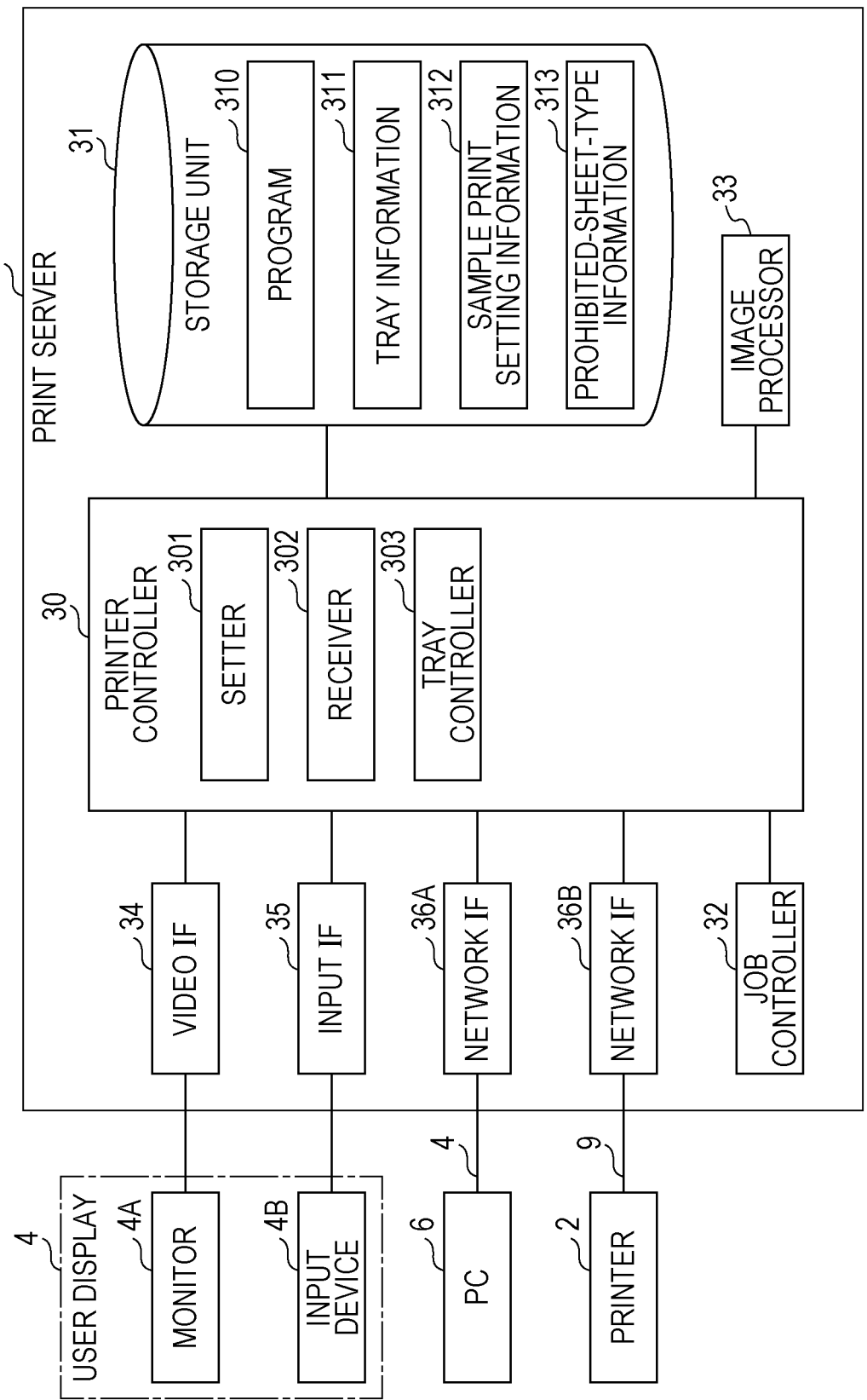
FIG. 2 is a block diagram illustrating an example of a control system of a print server.

FIG. 2 is a block diagram illustrating an example of a control system of the print server 3. The print server 3 includes a printer controller 30, a storage unit 31, a job controller 32, an image processor 33, a video interface (IF) 34, an input IF 35, and network IFs 36A and 36B. The printer controller 30 is an example of a controller.

The printer controller 30 is constituted by a central processing unit (CPU), an interface, and a memory. As a result of operating in accordance with a program 310 stored in the storage unit 31, the CPU serves as a setter 301, a receiver 302, and a tray controller 303. Details of the setter 301, the receiver 302, and the tray controller 303 will be discussed later. The setter 301 is an example of a setter.

When an error has occurred in the printer 2, the printer controller 30 receives error information indicating the content of the error from the printer 2. Upon receiving this error information, a print job temporarily stops. When the printer 2 is recovered from the error, the printer controller 30 receives from the printer 2 error recovery information indicating that the printer 2 has been recovered from the error.

The storage unit 31 is constituted by a read only memory (ROM), a random access memory (RAM), a hard disk, and the like. In the storage unit 31, the program 310 and various items of information, such as tray information 311, sample print setting information 312, and prohibited-sheet-type information 313 are stored.

Examples of the tray information 311 are information concerning the sheet feeder trays 20a of the printer 2 and information concerning the sheet output units of the printer 2. Examples of the information concerning the sheet feeder trays 20a are identification information concerning the identification of the sheet feeder trays 20a, such as names, and information concerning sheets, such as types, sizes, and directions of sheets with respect to a transport direction, stored in the sheet feeder trays 20a in association with the identification information concerning the sheet feeder trays 20a. An example of the information concerning the sheet output units is identification information concerning the identification of the sheet output units, such as names.

Examples of the sample print setting information 312 are information concerning a sample sheet, such as the type and size of a sheet to be used as a sample sheet, and the direction of this sheet with respect to the transport direction, and information concerning the sheet feeder tray 20a and the sheet output unit to be used for sample printing.

The prohibited-sheet-type information 313 is information indicating the content of settings set on a prohibited-sheet-type setting screen 45, which will be discussed later, shown in FIG. 4. Examples of the prohibited-sheet-type information 313 are information concerning prohibited types of sheets to be prohibited from being used as a sample sheet and substitute types of sheets to be used instead of the prohibited types of sheets.

The job controller 32 receives print jobs from the PCs 6 and manages the print order of the received print jobs. The job controller 32 also instructs the printer controller 30 to execute the received print jobs. A print job includes header information and print data, for example, in this order. The print data is page data converted from document data and is described in a page description language (PDL) that can be interpreted by the printer 2. Examples of the header information are print control information and information concerning the sheet feeder tray 20a and the sheet output unit used for printing.

The image processor 33 performs image processing, which is required for printing in the printer 2, on print data. Examples of the image processing are interpreting processing for a PDL and raster image processor (RIP) processing for converting PDL print data into raster image data.

After error information has been received from the printer 2 and a print job has temporarily stopped, when the printer controller 30 receives error recovery information, the setter 301 executes the following processing. The setter 301 displays a screen for setting a sheet to be used as a sample sheet on the monitor 4A and stores the content of settings set by a user using the input device 4B in the storage unit 31 as the sample print setting information 312. The setter 301 also displays a screen for setting sheet types to be prohibited from being used as a sample sheet on the monitor 4A, and stores the content of settings set by a user using the input device 4B in the storage unit 31 as the prohibited-sheet-type information 313. The sample print setting information 312 may be preset before a print job temporarily stops.

The receiver 302 receives an instruction to execute sample printing from the user display 4 when a print job has temporarily stopped.

The tray controller 303 obtains tray information concerning the printer 2 by communicating with the printer 2 and stores the tray information in the storage unit 31 as the tray information 311. The tray controller 303 also provides the printer 2 with an instruction concerning which sheet feeder tray 20a will be used to feed a sheet as a sample sheet and concerning which sheet output unit will be used to output the sample sheet in accordance with the sample print setting information 312 stored in the storage unit 31.

In a case in which the printer 2 prints a sample sheet while a print job is being executed, if a sheet to be used as the sample sheet is a prohibited type of sheet to be prohibited from being used as the sample sheet, the tray controller 303 performs control so that the prohibited type of sheet will be switched to a sheet which is preset as a substitute type of sheet and the sheet feeder will feed the sheet preset as the substitute type of sheet. More specifically, if the prohibited type of sheet is an index sheet (may also be called a tab sheet), the tray controller 303 may perform control so that index information on the index sheet will be printed on the sheet preset as the substitute type of sheet at a position displaced from the position of the index information on the index sheet. In this case, the tray controller 303 may perform control so that the index information will be printed on the sheet preset as the substitute type of sheet at a position corresponding to the position of a tab of the index sheet in a direction perpendicular to a transport direction. If the prohibited type of sheet is an index sheet, the tray controller 303 may perform control so that index information on the index sheet may be printed on a sheet preset as the substitute type of sheet which is large enough to contain a tab of the index sheet. In this case, as shown in FIG. 6C, index information 212 or a tab image 211a may be printed without displacing the position thereof on the substitute type of sheet.

In some cases, an index sheet is inserted to make the headings of chapters and sections of a printed material noticeable. To avoid the disturbance of the output order of index sheets or to minimize the use of index sheets which are more expensive than plain sheets, if a specific type of sheet, such an index sheet, is set as a sheet for printing a check page, the use of this specific type of sheet as a sample sheet may be prohibited in this exemplary embodiment.

If the page corresponding to a sample sheet is blank, the tray controller 303 may perform control so that a screen for checking whether a sample sheet will be output will be displayed on the monitor 4A.

(Settings for Sample Printing)

Figure 3:
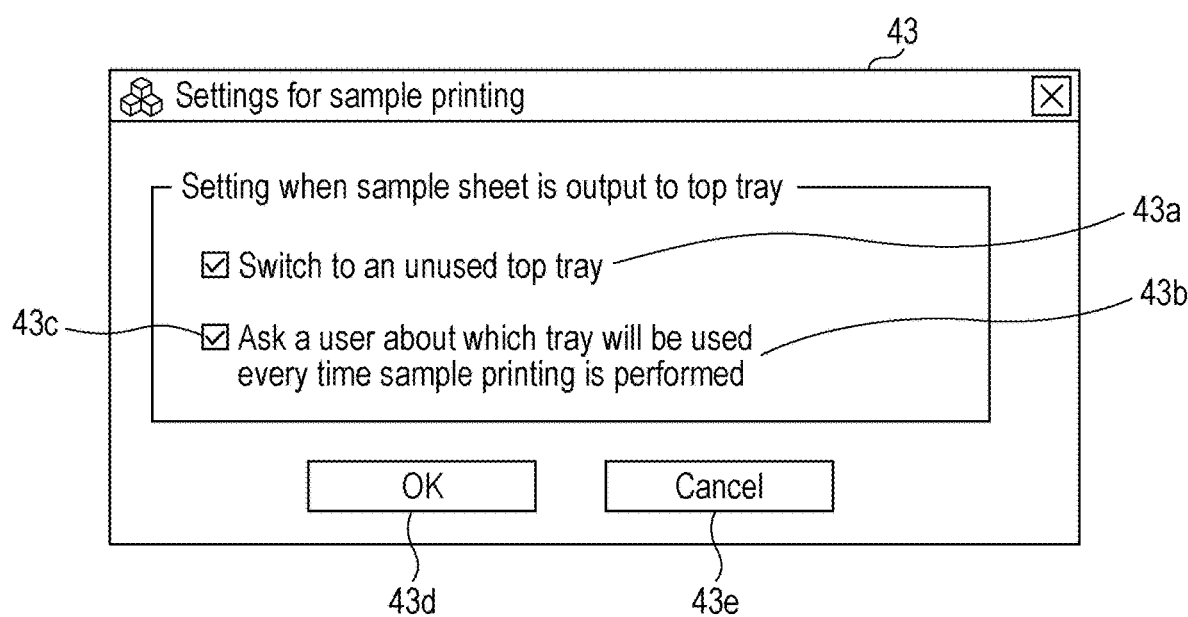
FIG. 3 illustrates an example of a setting screen for sample printing displayed on a monitor.

FIG. 3 illustrates an example of a setting screen for sample printing. On a setting screen 43 for sample printing shown in FIG. 3, as a setting when a sample sheet is output to a top tray, an option 43a "Switch to an unused top tray" and an option 43b "Ask a user about which tray will be used every time sample printing is performed" are displayed. Check boxes 43c for selecting the options 43a and 43b are also indicated. An "OK" button 43d for setting the content of a setting and a "Cancel" button 43e for canceling the content of a setting are also displayed.

The setter 301 displays the setting screen 43 on the monitor 4A in response to a request from a user. When the user has set a setting on the setting screen 43 by operating the input device 4B, the setter 301 stores the content of the setting in the storage unit 31 as the sample print setting information 312.

If the user selects the option 43a "Switch to an unused top tray" and operates the "OK" button 43d, the tray controller 303 performs control so that a sample sheet will be output to an unused top tray.

If the user checks the option 43b "Ask a user about which tray will be used every time sample printing is performed" and operates the "OK" button 43d, the tray controller 303 performs control so that, every time sample printing is performed, a query screen will be displayed on the monitor 4A to instruct a user to select a sheet output unit and a sample sheet will be output to the sheet output unit selected by the user.

If both of the options 43a and 43b are selected, the tray controller 303 performs control so that the operation of the content of the option 43a "Switch to an unused top tray" will preferentially be executed.

(Settings of Prohibited Types of Sheets)

Figure 4:
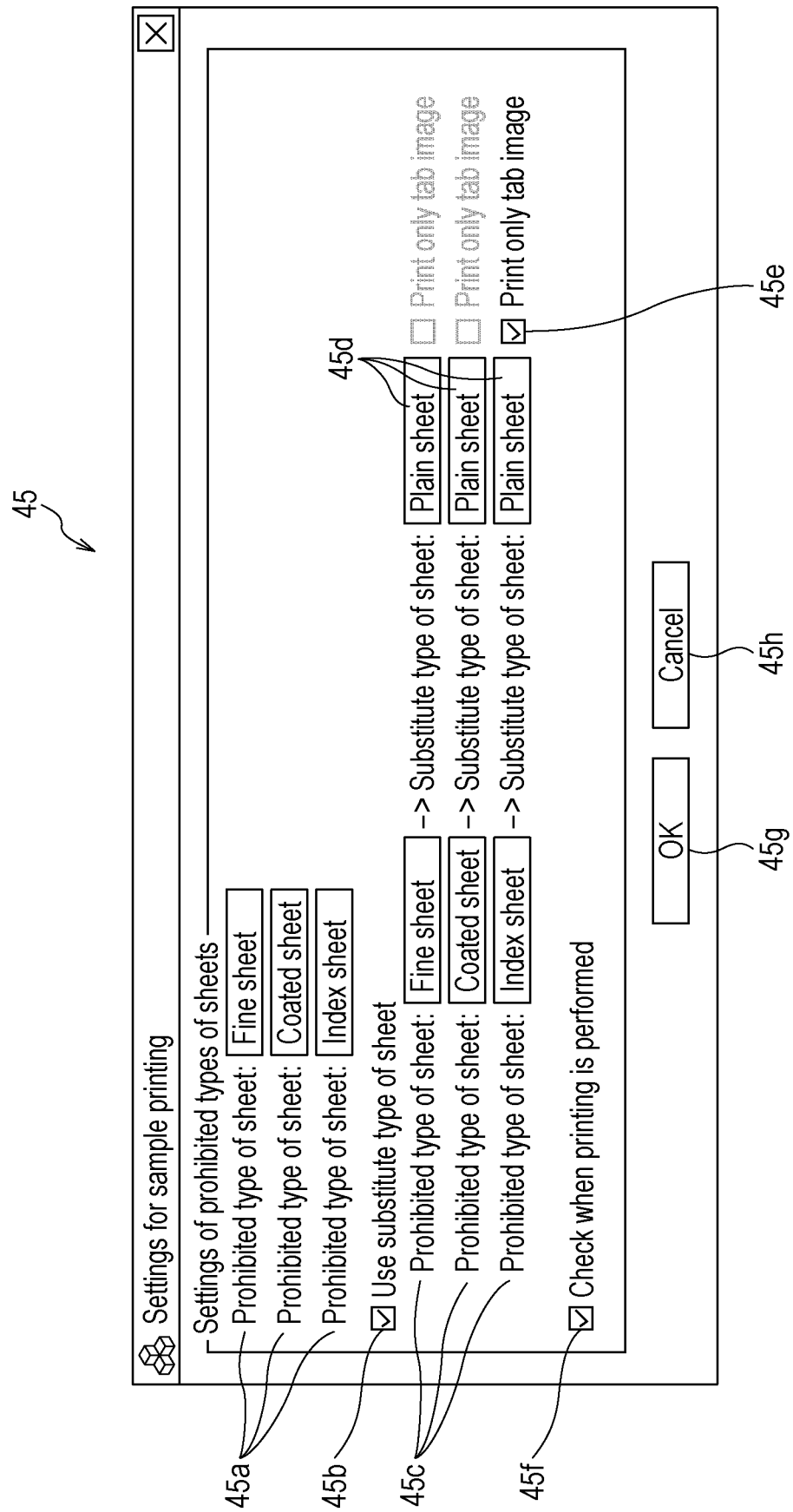
FIG. 4 illustrates an example of a prohibited-sheet-type setting screen displayed on the monitor.

FIG. 4 illustrates an example of a prohibited-sheet-type setting screen 45 for setting types of sheets to be prohibited from being used as a sample sheet. The prohibited-sheet-type setting screen 45 includes plural fields 45a for setting prohibited types of sheets and a check box 45b for using a substitute type of sheet. The prohibited-sheet-type setting screen 45 also includes plural fields 45c indicating the prohibited types of sheets, plural fields 45d for setting substitute types of sheets to be used instead of the associated prohibited types of sheets set in the plural fields 45c, a check box 45e for printing only a tab image if an index sheet is selected in the field 45c, and a check box 45f for displaying the prohibited-sheet-type setting screen 45 and checking the settings when sample printing is performed. An "OK" button 45g for setting the content of settings and a "Cancel" button 45h for canceling the content of settings are also displayed.

The setter 301 displays the prohibited-sheet-type setting screen 45 on the monitor 4A in response to a request from a user. When the user has set settings on the prohibited-sheet-type setting screen 45 by operating the input device 4B, the setter 301 stores the content of the settings in the storage unit 31 as the prohibited-sheet-type information 313.

Figure 5:
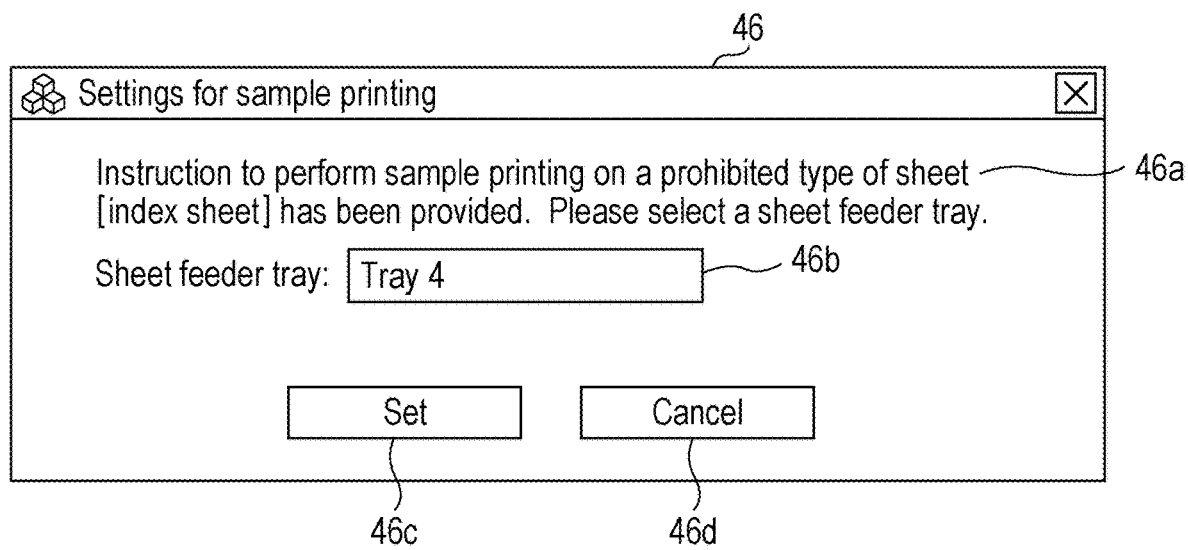
FIG. 5 illustrates an example of a feeder tray selecting screen displayed on the monitor.

If the check box 45f for displaying the prohibited-sheet-type setting screen 45 and checking the settings when sample printing is performed is checked, the setter 301 displays a feeder tray selecting screen 46 shown in FIG. 5 on the monitor 4A.

FIG. 5 illustrates an example of a feeder tray selecting screen. On the feeder tray selecting screen 46, a message 46a is displayed to inform a user that an instruction to perform sample printing on an index sheet, which is one of the prohibited types of sheets, has been provided and to instruct the user to select a sheet feeder tray for sample printing. An input field 46b for inputting a sheet feeder tray by selecting the sheet feeder tray from a pull-down menu, a "Set" button 46c for setting the selected sheet feeder tray, and a "Cancel" button 46d for canceling the selected sheet feeder tray are also displayed.

If the user selects and inputs a sheet feeder tray into the input field 46b and operates the "Set" button 46c, the tray controller 303 performs control so that the sheet feeder tray 20a selected by the user will feed a substitute type of sheet for an index sheet.

Figure 6A:
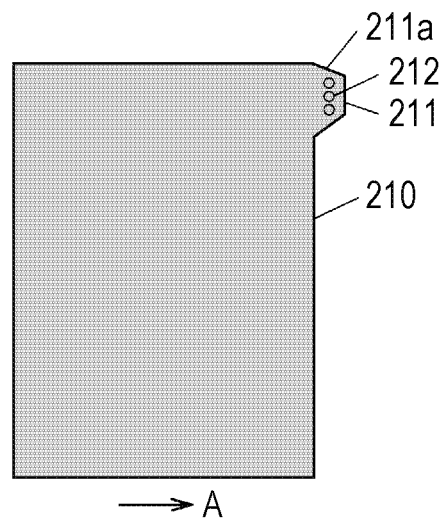
FIGS. 6A through 6C illustrate examples of sample printing.
Figure 6B:
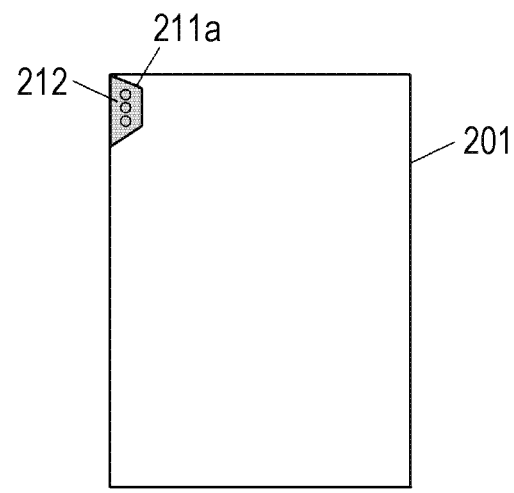
Figure 6C:
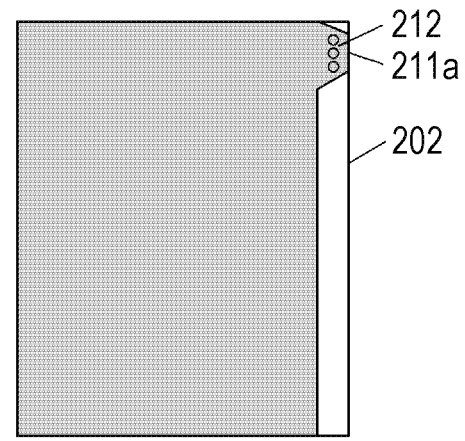

If the check box 45e for printing only a tab image is checked on the prohibited-sheet-type setting screen 45, the printer controller 30 performs control so that the printer unit 21 of the printer 2 will print a tab image 211a (including a background and index information 212) of a tab 211 of an index sheet 210 shown in FIG. 6A on a sheet 201 at a position displaced from that on the index sheet 210 in the direction opposite the transport direction A, as shown in FIG. 6B. Examples of the index information 212 are characters, symbols, and figures. Instead of the tab image 211a, only the index information 212 may be printed. If the position of the tab 211 in a direction perpendicular to the transport direction A is different among index sheets 210, the tab image 211a or the index information 212 may preferably be printed on the sheet 201 at a position corresponding to the position of the tab 211. This allows the user to easily identify the index information 212.

If the check box 45e for printing only a tab image 211a is not checked, the printer controller 30 performs control so that the printer unit 21 of the printer 2 will print the same image as the index sheet 210 on a sheet 202 which is large enough to contain the index sheet 210, as shown in FIG. 6C.

Figure 7:
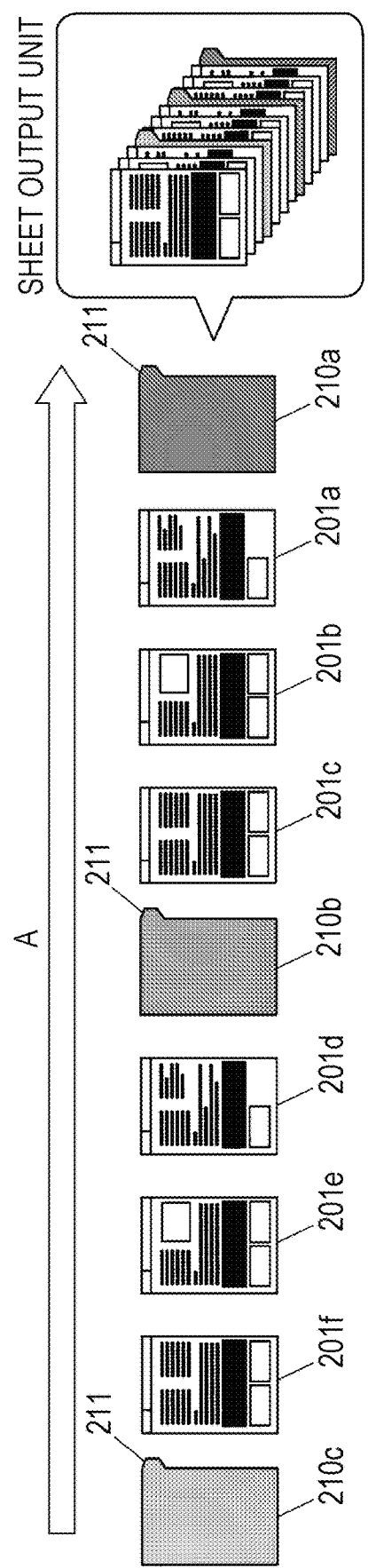
FIG. 7 illustrates an example of the use of index sheets.

FIG. 7 illustrates an example of the use of index sheets 210. More specifically, FIG. 7 illustrates a state in which sheets 201a through 201c are sequentially printed between index sheets 210a and 210b and sheets 201d through 201f are sequentially printed between the index sheet 210b and an index sheet 210c. In the example in FIG. 7, the positions of the tabs 211 in the index sheets 210a through 210c are the same. However, the positions of the tabs 211 in the index sheets 210a through 210c may be different from each other in a direction perpendicular to the transport direction A.

(Operation of Exemplary Embodiment)

Figure 8:
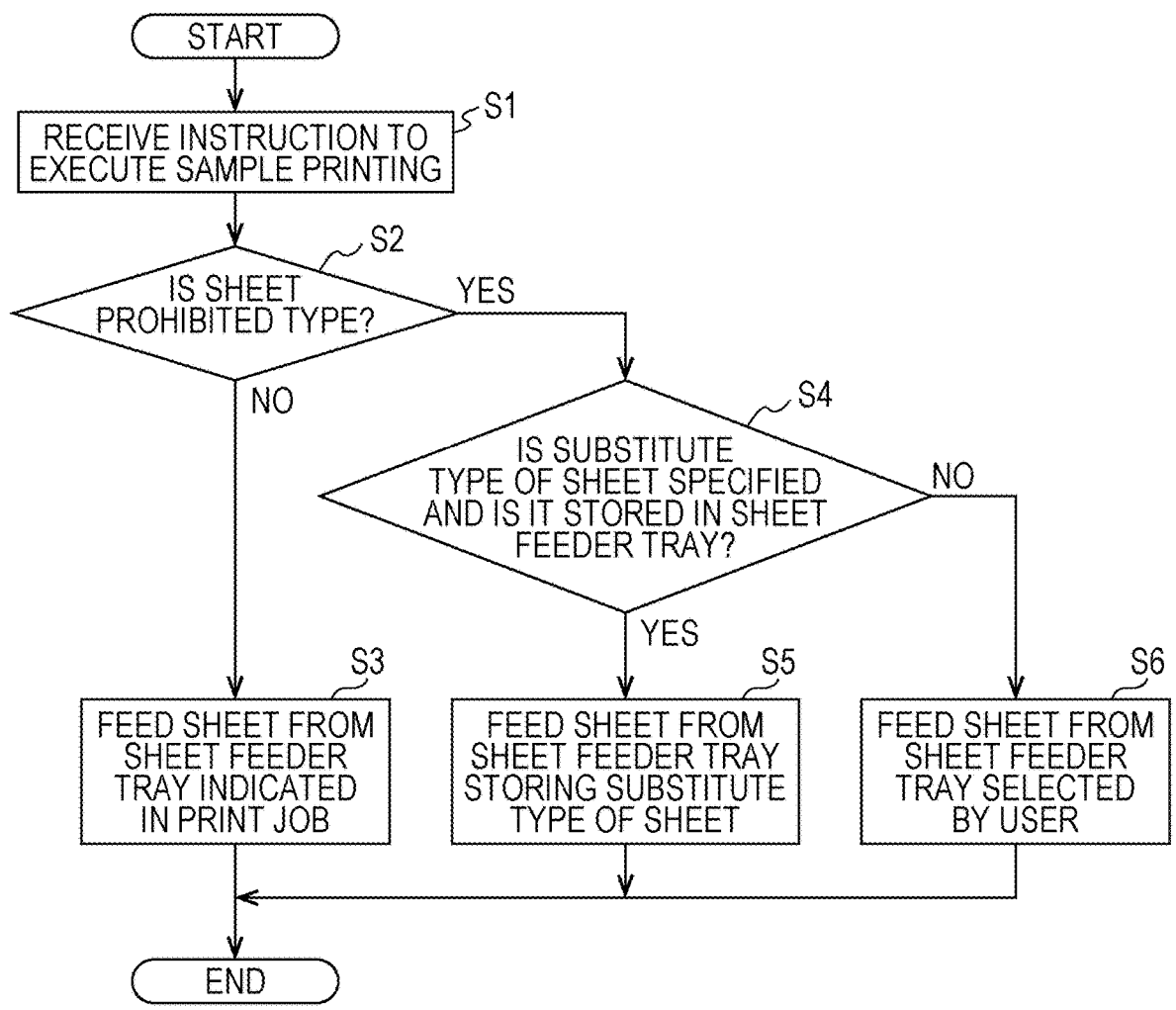
FIG. 8 is a flowchart illustrating an example of the operation of the print server according to the exemplary embodiment.

An example of the operation of the print system 1 according to the exemplary embodiment will be described below with reference to FIG. 8. FIG. 8 is a flowchart illustrating an example of the operation of the print server 3.

If a print job has temporarily stopped for some reason, such as an error or paper out, the setter 301 of the print server 3 receives settings for sample printing. The setter 301 then stores information concerning the received settings in the storage unit 31 as the sample print setting information 312. The receiver 302 displays a screen for receiving an instruction to execute sample printing on the monitor 4A. It is assumed that the prohibited-sheet-type information 313 has already been stored in the storage unit 31.

A user provides an instruction to execute sample printing on the screen displayed on the monitor 4A by operating the input device 4B. Then, the receiver 302 receives this instruction in step S1.

In step S2, the tray controller 303 judges whether a sheet indicated by the sample print setting information 312 is one of the prohibited types of sheets indicated by the prohibited-sheet-type information 313. If it is found in step S2 that the sheet indicated by the sample print setting information 312 is not one of the prohibited types of sheets (NO in step S2), the print server 3 proceeds to step S3. In step S3, the tray controller 303 performs control so that the sheet feeder tray 20a storing the type of sheet indicated by the sample print setting information 312 will feed a sheet as a sample sheet. More specifically, a check page is printed on a sheet fed from the sheet feeder 20a as a sample sheet, and the sample sheet is output to a top tray which is specified by the sample print setting information 312 as the sheet output unit for the sample sheet, such as the finisher output tray 26.

If the sheet indicated by the sample print setting information 312 is one of the prohibited types of sheets (YES in step S2), the print server 3 proceeds to step S4. In step S4, by referring to the prohibited-sheet-type information 313 and the tray information 311, the tray controller 303 judges whether a substitute type of sheet is specified and whether the substitute type of sheet is stored in a sheet feeder tray 20a.

If a substitute type of sheet is specified and if the substitute type of sheet is stored in a sheet feeder tray 20a (YES in step S4), the tray controller 303 performs control so that the sheet feeder tray 20a storing this type of sheet will feed a sheet as a sample sheet in step S5.

If a substitute type of sheet is not specified or if the substitute type of sheet is specified but is not stored in any sheet feeder tray 20a (NO in step S4), the tray controller 303 performs control so that the sheet feeder tray 20a storing the type of sheet selected by the user will feed a sheet in step S6.

(Modified Example)

If a check page is blank, a user may be allowed to decide whether sample printing will be performed.

If the page corresponding to a sample sheet is blank, the printer controller 30 may perform control so that a screen for checking whether a sample sheet will be output will be displayed on the monitor 4A.

Figure 10:
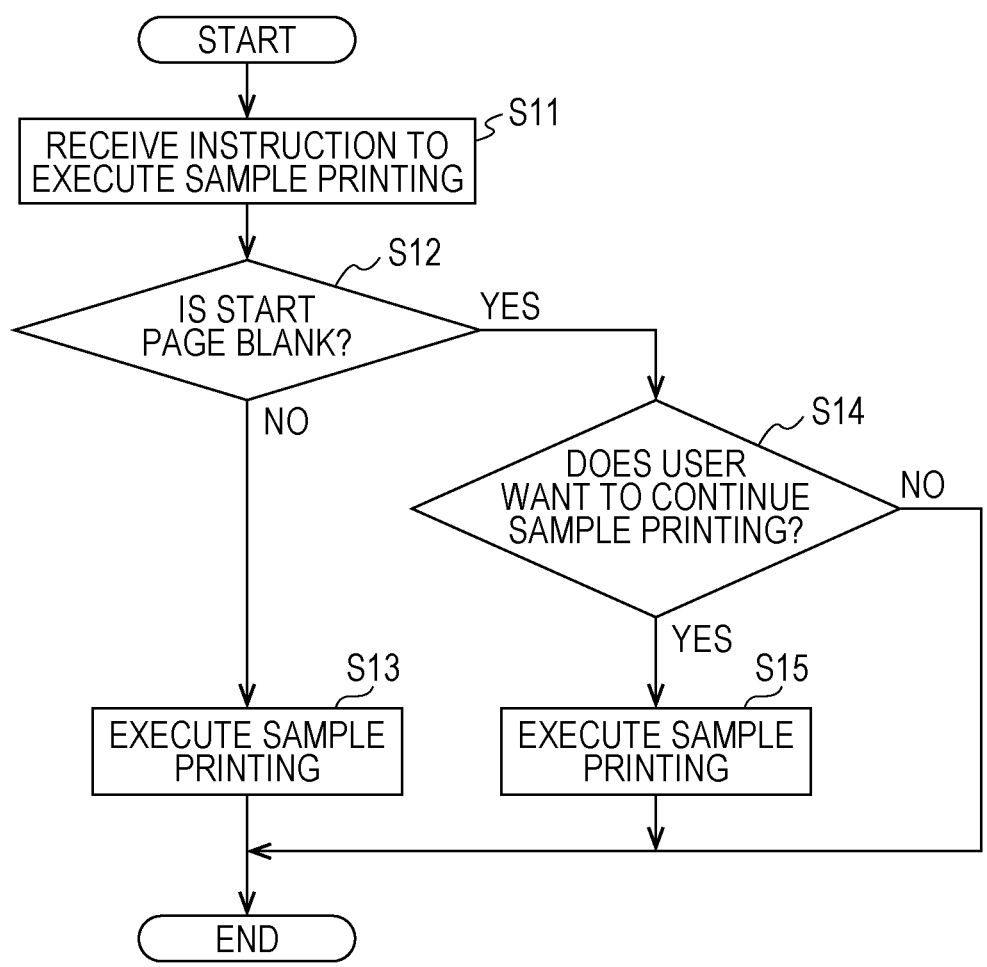
FIG. 10 is a flowchart illustrating an example of the operation of the print server according to a modified example.

An example of the operation of the print system 1 according to a modified example will be described below with reference to FIG. 10. FIG. 10 is a flowchart illustrating an example of the operation of the print server 3 according to the modified example.

If a print job has temporarily stopped for some reason, such as an error or paper out, the setter 301 of the print server 3 receives settings for sample printing. The setter 301 then stores information concerning the received settings in the storage unit 31 as the sample print setting information 312. The receiver 302 displays a screen for receiving an instruction to execute sample printing on the monitor 4A.

A user provides an instruction to execute sample printing on the screen displayed on the monitor 4A by operating the input device 4B. Then, the receiver 302 receives this instruction in step S11.

In step S12, the tray controller 303 judges based on print data whether the start page is blank. If the start page is not blank (NO in step S12), the tray controller 303 executes sample printing in accordance with information concerning the settings for sample printing in step S13.

If the start page is blank (YES in step S12), the tray controller 303 performs control so that a checking screen 47 shown in FIG. 9 will be displayed on the monitor 4A and a query will be made to a user in step S14.

Figure 9:
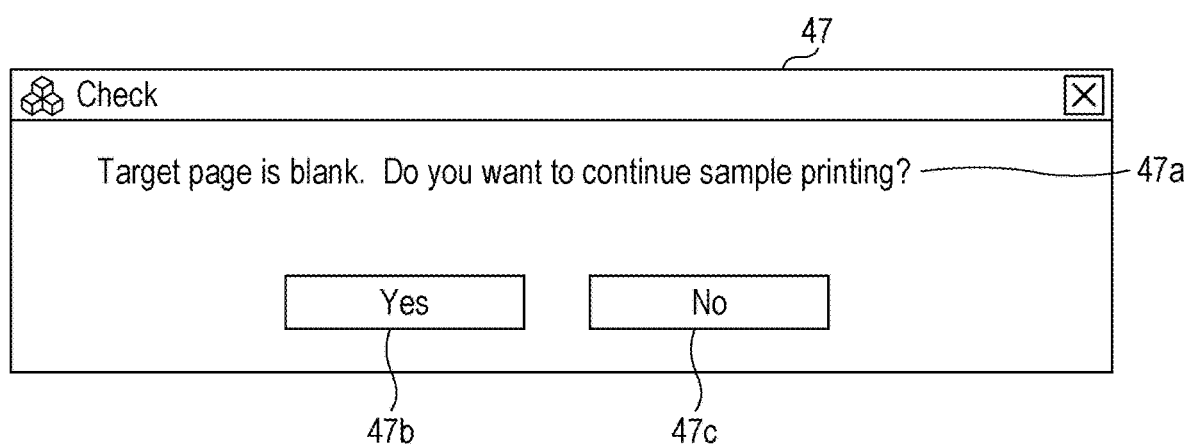
FIG. 9 illustrates an example of a checking screen displayed on the monitor.

FIG. 9 illustrates an example of a checking screen displayed on the monitor 4A. On the checking screen 47, a message 47a is displayed to inform the user that the start page is blank and to ask the user whether to continue sample printing. A "Yes" button 47b and a "No" button 47c are also displayed.

If the user has pressed the "Yes" button 47b (YES in step S14), the printer controller 30 executes sample printing in step S15. If the user has pressed the "No" button 47c (NO in step S14), the printer 30 terminates the processing without executing sample printing.

Although the exemplary embodiment has been discussed above, the present invention is not restricted thereto. Various modifications may be made without departing from the spirit and scope of the invention. For example, the printer 2 may have the functions of the print server 3 as a controller. In the above-described exemplary embodiment, sample printing is performed after a print job has temporarily stopped. In the invention, however, sample printing may be performed without stopping the execution of a print job. For example, sample printing may be performed as a result of a user pressing a graphical user interface (GUI) software icon or a hardware button provided near a sheet output unit.

All or some of the elements of the printer controller 30 of the print server 3 may be constituted by a hardware circuit, such as a field programmable gate array (FPGA) or an application specific integrated circuit (ASIC).

Some of the elements of the above-described exemplary embodiment may be omitted or changed without departing from the spirit and scope of the invention. In the flowcharts of the above-described exemplary embodiment, steps may be added, deleted, changed, or replaced without departing from the spirit and scope of the invention. The program used in the above-described exemplary embodiment may be provided as a result of being recorded in a computer readable recording medium, such as a compact disc-read only memory (CD-ROM). The program may be stored in an external server, such as a cloud server, and be used via a network.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information control apparatus that controls a printer device, the printer device performing printing on a sheet fed from a sheet feeder in accordance with a print instruction, comprising:
   a controller that performs control, in a case in which the printer device outputs a check sheet while the print instruction is being executed, if a sheet to be used as the check sheet is a prohibited type of sheet to be prohibited from being used as the check sheet, so that the prohibited type of sheet will be switched to a sheet which is preset as a substitute type of sheet and the sheet feeder will feed the sheet preset as the substitute type of sheet.

2. The information control apparatus according to claim 1, wherein, if the prohibited type of sheet is a sheet having a projecting portion, the controller performs control so that information to be printed on the projecting portion will be printed on the sheet preset as the substitute type of sheet at a position displaced from a position of the projecting portion.

3. The information control apparatus according to claim 2, wherein the controller performs control so that the information to be printed on the projecting portion will be printed on the sheet preset as the substitute type of sheet at a position corresponding to the position of the projecting portion.

4. The information control apparatus according to claim 1, wherein, if the prohibited type of sheet is a sheet having a projecting portion, the controller performs control so that information to be printed on the projecting portion will be printed on a sheet preset as the substitute type of sheet which is large enough to contain the projecting portion.

5. The information control apparatus according to claim 1, wherein, if a page corresponding to the check sheet is blank, the controller performs control so that a screen for checking whether the check sheet will be output will be displayed.

6. The information control apparatus according to claim 1, further comprising:
   a setter that displays a setting screen including first and second fields, a type of sheet to be prohibited from being used as the check sheet being input into the first field, a type of sheet to be used as the substitute type of sheet instead of the type of sheet input into the first field being input into the second field, and that sets the type of sheet input into the first field and the type of sheet input into the second field as prohibited-sheet-type information,
   wherein the controller controls the sheet feeder based on the prohibited-sheet-type information.

7. The information control apparatus according to claim 2, further comprising:
   a setter that displays a setting screen including first and second fields, a type of sheet to be prohibited from being used as the check sheet being input into the first field, a type of sheet to be used as the substitute type of sheet instead of the type of sheet input into the first field being input into the second field, and that sets the type of sheet input into the first field and the type of sheet input into the second field as prohibited-sheet-type information,
   wherein the controller controls the sheet feeder based on the prohibited-sheet-type information.

8. The information control apparatus according to claim 3, further comprising:
   a setter that displays a setting screen including first and second fields, a type of sheet to be prohibited from being used as the check sheet being input into the first field, a type of sheet to be used as the substitute type of sheet instead of the type of sheet input into the first field being input into the second field, and that sets the type of sheet input into the first field and the type of sheet input into the second field as prohibited-sheet-type information,
   wherein the controller controls the sheet feeder based on the prohibited-sheet-type information.

9. The information control apparatus according to claim 4, further comprising:
   a setter that displays a setting screen including first and second fields, a type of sheet to be prohibited from being used as the check sheet being input into the first field, a type of sheet to be used as the substitute type of sheet instead of the type of sheet input into the first field being input into the second field, and that sets the type of sheet input into the first field and the type of sheet input into the second field as prohibited-sheet-type information,
   wherein the controller controls the sheet feeder based on the prohibited-sheet-type information.

10. The information control apparatus according to claim 5, further comprising:
    a setter that displays a setting screen including first and second fields, a type of sheet to be prohibited from being used as the check sheet being input into the first field, a type of sheet to be used as the substitute type of sheet instead of the type of sheet input into the first field being input into the second field, and that sets the type of sheet input into the first field and the type of sheet input into the second field as prohibited-sheet-type information,
    wherein the controller controls the sheet feeder based on the prohibited-sheet-type information.

11. The information control apparatus according to claim 6, wherein:
    the setting screen includes a selector that makes selection to determine, if the type of sheet input into the first field is a sheet having a projecting portion, whether information to be printed on the projecting portion will be printed on the type of sheet input into the second field at a position displaced from a position of the projecting portion or a page corresponding to the check sheet will be printed on a sheet large enough to contain the projecting portion; and
    the controller performs control in accordance with a selection result of the selector.

12. The information control apparatus according to claim 7, wherein:
    the setting screen includes a selector that makes selection to determine, if the type of sheet input into the first field is a sheet having a projecting portion, whether information to be printed on the projecting portion will be printed on the type of sheet input into the second field at a position displaced from a position of the projecting portion or a page corresponding to the check sheet will be printed on a sheet large enough to contain the projecting portion; and
the controller performs control in accordance with a selection result of the selector.

13. The information control apparatus according to claim 8, wherein:
the setting screen includes a selector that makes selection to determine, if the type of sheet input into the first field is a sheet having a projecting portion, whether information to be printed on the projecting portion will be printed on the type of sheet input into the second field at a position displaced from a position of the projecting portion or a page corresponding to the check sheet will be printed on a sheet large enough to contain the projecting portion; and
the controller performs control in accordance with a selection result of the selector.

14. The information control apparatus according to claim 9, wherein:
the setting screen includes a selector that makes selection to determine, if the type of sheet input into the first field is a sheet having a projecting portion, whether information to be printed on the projecting portion will be printed on the type of sheet input into the second field at a position displaced from a position of the projecting portion or a page corresponding to the check sheet will be printed on a sheet large enough to contain the projecting portion; and
the controller performs control in accordance with a selection result of the selector.

15. The information control apparatus according to claim 10, wherein:
the setting screen includes a selector that makes selection to determine, if the type of sheet input into the first field is a sheet having a projecting portion, whether information to be printed on the projecting portion will be printed on the type of sheet input into the second field at a position displaced from a position of the projecting portion or a page corresponding to the check sheet will be printed on a sheet large enough to contain the projecting portion; and
the controller performs control in accordance with a selection result of the selector.

16. A print system comprising:
a printer device that performs printing on a sheet fed from a sheet feeder in accordance with a print instruction; and
a controller that performs control, in a case in which the printer device outputs a check sheet while the print instruction is being executed, if a sheet to be used as the check sheet is a prohibited type of sheet to be prohibited from being used as the check sheet, so that the prohibited type of sheet will be switched to a sheet which is preset as a substitute type of sheet and the sheet feeder will feed the sheet preset as the substitute type of sheet.

17. A non-transitory computer readable medium storing a program causing a computer to execute a process for controlling a printer device, the printer device performing printing on a sheet fed from a sheet feeder in accordance with a print instruction, the process comprising:
performing control, in a case in which the printer device outputs a check sheet while the print instruction is being executed, if a sheet to be used as the check sheet is a prohibited type of sheet to be prohibited from being used as the check sheet, so that the prohibited type of sheet will be switched to a sheet which is preset as a substitute type of sheet and the sheet feeder will feed the sheet preset as the substitute type of sheet.

* * * * *